United States Patent
Davies et al.

(10) Patent No.: US 12,537,671 B2
(45) Date of Patent: Jan. 27, 2026

(54) KEY GENERATION METHOD

(71) Applicant: nChain Licensing AG, Zug (CH)

(72) Inventors: Jack Owen Davies, London (GB); Simon Ordish, London (GB)

(73) Assignee: nChain Licensing AG, Zug (CH)

( * ) Notice: Subject to any disclaimer, the term of this patent is extended or adjusted under 35 U.S.C. 154(b) by 246 days.

(21) Appl. No.: 18/036,625

(22) PCT Filed: Oct. 28, 2021

(86) PCT No.: PCT/EP2021/079948
§ 371 (c)(1),
(2) Date: May 11, 2023

(87) PCT Pub. No.: WO2022/101023
PCT Pub. Date: May 19, 2022

(65) Prior Publication Data
US 2023/0421366 A1 Dec. 28, 2023

(30) Foreign Application Priority Data
Nov. 13, 2020 (GB) .................................. 2017883

(51) Int. Cl.
*H04L 9/08* (2006.01)
*H04L 9/00* (2022.01)
*H04L 9/32* (2006.01)

(52) U.S. Cl.
CPC .......... *H04L 9/0836* (2013.01); *H04L 9/0861* (2013.01); *H04L 9/3247* (2013.01); *H04L 9/50* (2022.05)

(58) Field of Classification Search
CPC ... H04L 9/0836; H04L 9/0861; H04L 9/3247; H04L 9/50; H04L 2209/16
See application file for complete search history.

(56) References Cited

U.S. PATENT DOCUMENTS

| 6,307,936 | B1 * | 10/2001 | Ober | G06F 21/82 |
| | | | | 380/46 |
| 6,539,092 | B1 * | 3/2003 | Kocher | H04L 9/0625 |
| | | | | 380/252 |

(Continued)

FOREIGN PATENT DOCUMENTS

| CN | 109088902 | * | 12/2018 | ........... H04L 9/0861 |
| JP | 5858506 | B1 | 2/2016 | |
| KR | 20200064017 | * | 6/2020 | ........ G06Q 20/03829 |

OTHER PUBLICATIONS

Khovratovich et al.; "BIP32-Ed25519 Hierarchical Deterministic Keys over a Non-linear Keyspace", 2017, IEEE European Symposium on Security and Privacy Workshops (EuroS&PW), pp. 27-31. (Year: 2017).*

(Continued)

*Primary Examiner* — Matthew Smithers
(74) *Attorney, Agent, or Firm* — Messner Reeves LLP

(57) ABSTRACT

A computer-implemented method of generating keys of a hierarchical key structure, wherein the method is performed by a key generator and comprises: obtaining a child key derivation path, wherein the child key derivation path comprises a sequence of elements, wherein the sequence of elements comprises one or more sets of one or more elements, each set of elements being generated based on a respective data item of a data path, and wherein each element in the sequence corresponds to a respective position of key in a respective level of the key structure; and generating one or more child keys based on the child key derivation path, wherein each respective child key is generated based on a respective element in the sequence at the respective position and of the respective level corresponding to that respective element.

16 Claims, 11 Drawing Sheets

(56) References Cited

U.S. PATENT DOCUMENTS

| | | | | |
|---|---|---|---|---|
| 6,959,086 | B2* | 10/2005 | Ober | G06F 8/60 |
| | | | | 380/259 |
| 8,621,187 | B2* | 12/2013 | Vauclair | G06F 21/14 |
| | | | | 712/230 |
| 8,892,865 | B1* | 11/2014 | Roth | H04L 63/064 |
| | | | | 713/184 |
| 9,215,076 | B1* | 12/2015 | Roth | H04L 9/3247 |
| 9,935,772 | B1* | 4/2018 | Madisetti | G06F 21/6209 |
| 10,102,526 | B1* | 10/2018 | Madisetti | G06Q 20/389 |
| 10,187,373 | B1* | 1/2019 | Poole | H04L 9/3213 |
| 10,491,404 | B1* | 11/2019 | Yamamoto | H04L 9/50 |
| 10,664,451 | B1* | 5/2020 | Liao | G06F 16/1824 |
| 10,841,081 | B2* | 11/2020 | Resch | H04L 9/0656 |
| 11,212,268 | B2* | 12/2021 | Madisetti | H04L 9/14 |
| 2009/0232302 | A1* | 9/2009 | Ptasinski | H04W 12/0431 |
| | | | | 713/171 |
| 2012/0124372 | A1 | 5/2012 | Dilley et al. | |
| 2018/0288022 | A1* | 10/2018 | Madisetti | G06Q 20/3829 |
| 2018/0337904 | A1* | 11/2018 | Letourneau | H04L 9/0866 |
| 2019/0305943 | A1 | 10/2019 | Hoersten et al. | |
| 2019/0354970 | A1* | 11/2019 | Di Iorio | G06Q 20/3829 |
| 2021/0083872 | A1* | 3/2021 | Desmarais | H04L 9/0894 |

OTHER PUBLICATIONS

PCT/EP2021/079948 International Search Report and Written Opinion dated Feb. 1, 2022, 13 pages.

Balistreri Michele: "EIP-1581: Non-wallet usage of keys derived from BIP-32 trees", Ethereum Improvement Proposals, No. 1581, Nov. 1, 2018 (Nov. 1, 2018) XP055827278, Retrieved from the Internet: URL: https://eips.ethereum.org/EIPS/eip-1581 [retrieved on Jul. 23, 2021] pp. 2,3.

GB2017883.6 Combined Search and Examination Report dated Aug. 11, 2021, 9 pages.

Techmedia-Think: "HD Wallet (BIP-32)," Develop with pleasure, Hatena Blog, Jan. 7, 2017, 10 pages, retrieved 1 from the Internet URL: https://techmedia-think.hatenablog.com/entry/2017/01/07/142406.

* cited by examiner

KEY GENERATION METHOD

CROSS REFERENCE TO RELATED APPLICATIONS

This application is the U.S. National Stage of International Application No. PCT/EP2021/079948 filed on Oct. 28, 2021, which claims the benefit of United Kingdom Patent Application No. 2017883.6, filed on Nov. 13, 2020, the contents of which are incorporated herein by reference in their entireties.

TECHNICAL FIELD

The present disclosure relates to a method of generating keys (e.g. private keys) of a hierarchical key structure. For instance, the keys may be used for encrypting data, signing blockchain transactions, and generating blockchain addresses.

BACKGROUND

In the context of blockchain technology, a "wallet application" or just a "wallet" typically refers to an application that, amongst other things, is configured to store a collection of keys (i.e. public and/or private keys) owned by a particular party.

To maintain privacy on a public blockchain, it is recommended to avoid the reuse of public keys, which are derived from private keys. This can lead to wallets being a collection of randomly generated private keys that need to be securely stored, and frequently backed up to ensure that the keys are not lost or stolen. By avoiding key reuse, this type of wallet can quickly generate a 'bag of keys' problem.

Hierarchical deterministic (HD) wallets were proposed to improve the efficiency of storage and regeneration of keys, resolving this bag of keys problem. HD wallets bring additional benefits in terms of privacy and having the ability to share branches of the wallet with different systems or subsystems. This type of wallet can generate many keys from a single random seed and is the most common type of blockchain wallet used today.

Wallet implementations generally follow bitcoin improvement proposal 32 (BIP32) which describes how to derive multiple child keys from a parent key, and BIP44 which defines purposes of branches within the wallet. In an HD wallet implementation, a master private key is derived from a random seed. This master private key is used to derive generations of keys (children, grandchildren and so on).

FIG. 4 illustrates the resultant tree-like structure that emerges in an HD wallet. The data structure is a powerful mechanism for managing the security of wallets and their ability to recover funds during restoration. Depending on the implementation, observers can create a sequence of public keys without the corresponding private keys. Since fewer secrets need to be stored, there is a lower risk of exposure. In addition, if keys are lost, they can be recovered from the seed key.

The equation for deriving a child key from a parent key depends on whether the public or private key of the parent will be used; use of the parent private key results in a 'hardened' child key, and use of the parent public key results in a 'normal' (i.e. non-hardened, in keeping with BIP32 terminology) child key.

Child keys are generated using a child key derivation (CKD) function. The particular form of CKD function depends on the particular wallet implementation, but in general a child key is based on a parent key and an index. The index allows a parent key to give rise to multiple child keys. I.e. a parent key may have multiple child keys. Normally the index takes a value of a sequence, with a first child key of the parent key taking a first value in the sequence (e.g. zero), a second child key of the parent key taking the next value in the sequence (e.g. one), and so on.

Note that at the time of writing, it is not possible to derive a hardened child public key if one only has knowledge of the parent public key and chain code. Requesting payment to normal child keys means that a receiver can give away only the parent public key (and chain code), and the sender can send payments by deriving multiple unhardened child keys. This way, a receiver of funds does not need to give each address to a sender explicitly. This ensures that multiple payments can be sent while minimising communication between the same two parties, and enhancing privacy when transacting on a public blockchain.

According to the BIP32 protocol, the equation for a normal child private key $sk_i$ is:

$$sk_i = sk_{par} + \text{HMAC512}_L(c_{par}, pk_{par} \| \text{index}), \quad (1)$$

and for a hardened child private key $sk'_i$ is $$sk'_i = sk_{par} + \text{HMAC512}_L(c_{par}, sk_{par} \| \text{index}'), \quad (2)$$

where
- $sk_{par}$ is the private key of the parent,
- $pk_{par}$ is the public key of the parent,
- $\text{HMAC512}_L$ (■) is the left 32 bytes of the result of the HMAC function that uses the SHA512 hash function,
- $c_{par}$ is the chain code of the parent key,
- index is the counter on the child keys that will increase each time a new child key is calculated, starting at 0. By convention, this is $0 \leq \text{index} < 2^{31}$ for normal keys and $2^{31} \leq \text{index}' \leq 2^{32}$ for hardened keys.

SUMMARY

The application of blockchain technology to data-oriented applications has become increasingly popular in recent years. It is now commonplace to find applications that utilise blockchain transactions as a data-enveloping mechanism to enable application data to be immutably recorded on the blockchain. This has additional benefits in the ability to combine the data itself with micropayments that may be associated with it.

The cryptographic keys used to sign blockchain transactions (e.g. ECDSA key-pairs) are most commonly derived using the BIP-32 hierarchical deterministic key-derivation standard discussed above. This standard allows wallets to be recovered from a single seed, which can further be made human-readable using the BIP-39 mnemonic standard. The BIP-32 standard leverages hierarchical paths to derive the individual keys from the master seed entropy, and the notion of splitting the key hierarchy into separate branches used for distinct partitions of funds (i.e. separate 'accounts') has been popularised by the BIP-44 standard.

It would be desirable to improve the interoperability between data-oriented blockchain applications and hierarchical key-derivation protocols such as the BIP standards or similar, which until now have generally only been used to provide hierarchy in a monetary sense.

According to one aspect disclosed herein, there is provided a computer-implemented method of generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a key generator and comprises: obtaining a child key derivation path, wherein the child key derivation path comprises a sequence of elements, wherein the sequence of elements comprises one or more sets of one or more elements, each set of elements being generated based on a respective data item of a data path, and wherein each element in the sequence corresponds to a respective position of key in a respective level of the key structure; and generating one or more child keys based on the child key derivation path, wherein each respective child key is generated based on a respective element in the sequence at the respective position and of the respective level corresponding to that respective element.

According to one aspect disclosed herein, there is provided a computer-implemented method of generating a data path for use by a key generator for generating keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a path generator and comprises: obtaining a data path comprising one or more data items; generating a respective set of one or more elements for each respective data item of the data path, wherein each respective set of elements together represent the data item, and each element of each set of elements is an integer; generating a child key derivation path based on the respective sets of one or more elements; and outputting the child key derivation path.

Each element in the child key derivation path corresponds to a position of a particular key in the key structure. Each element is generated based on a data item from a data path. For instance, the data path may represent a hierarchical data structure, with each data item belonging to a different level of the hierarchy. For instance, the data structure may be of a geographical nature, with a data path tracing from a country to a particular address, e.g. country, city, street address, house number. Alternatively, the data path may represent a data structure that is not hierarchical, but stores data items in a particular order. For example, the data structure may include personal identifiers, e.g. name, age, sex, nationality, etc. Regardless of what the data items represent, each data item is used to generate the elements of the key derivation path. Therefore the keys generated based on the positions in the key structure corresponding to the elements are directly based on the data items.

A key is generated for each element in the key derivation path. That is, a sequence of keys is generated that correspond to the sequence of elements in the key derivation path. A key corresponding to the nth element in the key derivation path is a parent key to a key corresponding to the n+1th element in the sequence (other than the last key to be generated). Therefore each generated key is linked to each other generated key, either having a parent-child link, or indirectly e.g. grandparent-grandchild link.

One advantage of generating keys in this way is that it is quick and easy to re-generate the same keys at a later time, e.g. if those keys are lost or deleted after use. That is, the same data path can be used to generate the same key derivation path, which in turn allows the same keys to be generated. Once the keys have been re-generated, they can be used as intended.

Some embodiments involve generating the data path related to a particular item of data that is being used in the application, and converting this data path into the key derivation path, from which subsequent keys are derived. These keys may then be used for multiple purposes, including the generation of ECDSA key pairs for signing blockchain transactions, or the generation of symmetric keys (e.g. AES keys) for encryption of the data item before it is added to a blockchain transaction.

Furthermore, in some embodiments the data path itself is obfuscated before it is converted into a derivation path. This allows the process of path-conversion and key-derivation to be performed by one party without that party having access to the underlying data or revealing the overall structure of the database of the application.

Note that the hierarchical key structure is not limited to that proposed by the BIP32 protocol, though that is one option. Note also that whilst the example use cases provided herein are primarily blockchain related, the described embodiments apply generally to the use of keys in any relevant setting. For instance, the child keys may be used as private keys to generate digital signatures which have application in many areas of technology. As another example, the child keys may be used as encryption keys in any setting.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
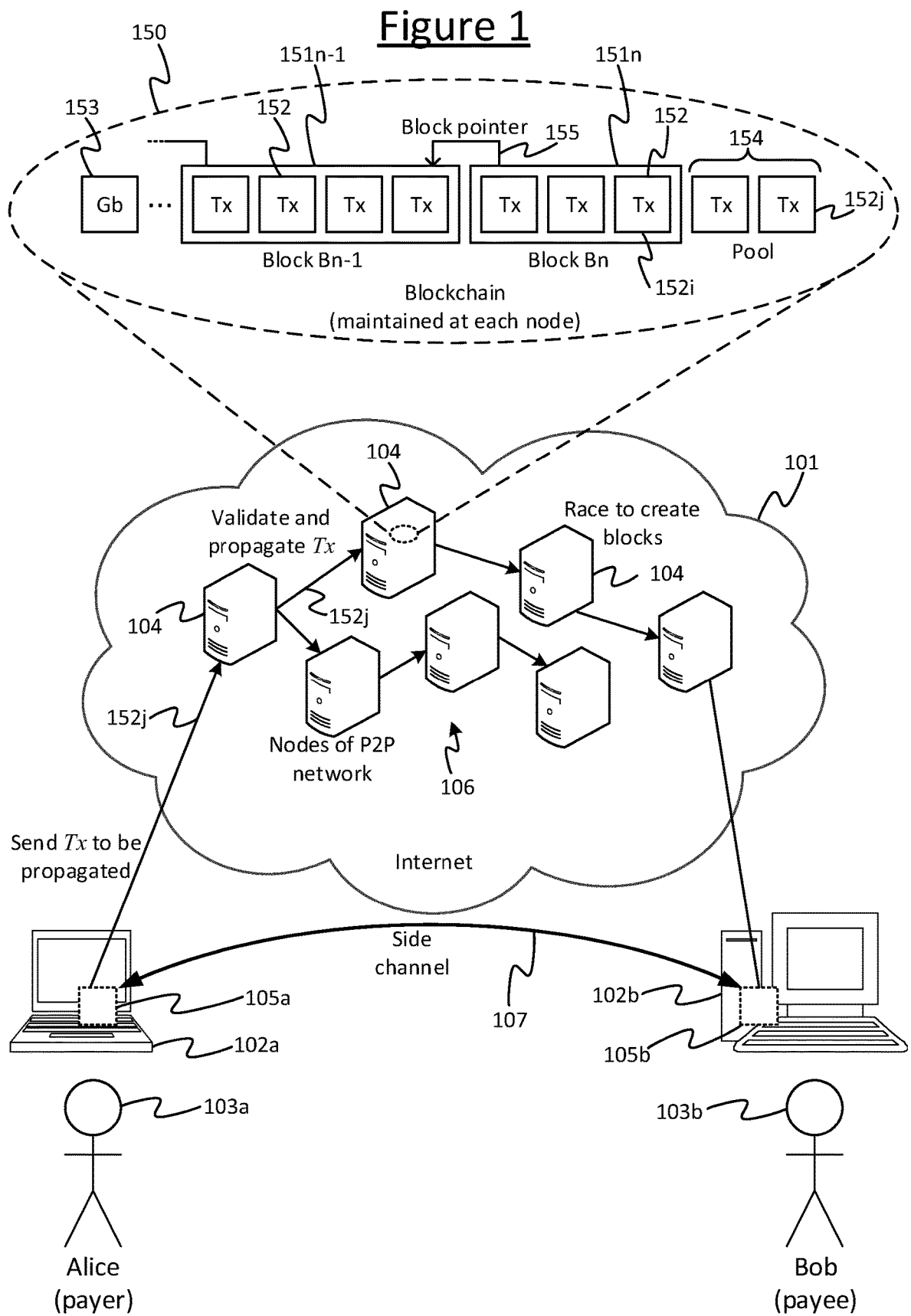
FIG. 1 is a schematic block diagram of a system for implementing a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the ordered set 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the input authorisation, for example the signature of the user 103a to whom the output of the preceding transaction 152i is locked. In turn, the output of the present transaction 152j can be cryptographically locked to a new user or entity 103b. The present transaction 152j can thus transfer the amount defined in the input of the preceding transaction 152i to the new user or entity 103b as defined in the output of the present transaction 152j. In some cases a transaction 152 may have multiple outputs to split the input amount between multiple users or entities (one of whom could be the original user or entity 103a in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152j (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152j could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152j matches the expected signature, which depends on the previous transaction 152i in an ordered sequence of transactions 152.

In such an output-based transaction protocol, this may comprise checking that the cryptographic signature or other authorisation of the party 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 104 forwards it to one or more other blockchain nodes 104 in the blockchain network 106. These other blockchain nodes 104 apply the same test according to the same blockchain node protocol, and so forward the new transaction 152j on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152j according to the blockchain node protocol. Another condition for a transaction to be valid is that the output of the preceding transaction 152i which it attempts to redeem has not already been redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103b and his/her respective computer equipment 102b. It will be understood that many more such parties 103 and their respective computer equipment 102 may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 104 that receives the transaction 152j will add the new validated transaction 152 to the ordered set of transactions 154 maintained at that blockchain node 104. Further, any blockchain node 104 that receives the transaction 152j will propagate the validated transaction 152 onward to one or more other blockchain nodes 104 in the network 106. Since each blockchain node 104 applies the same protocol, then assuming the transaction 152j is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152j). Once the proof-of-work has been done for the pool 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
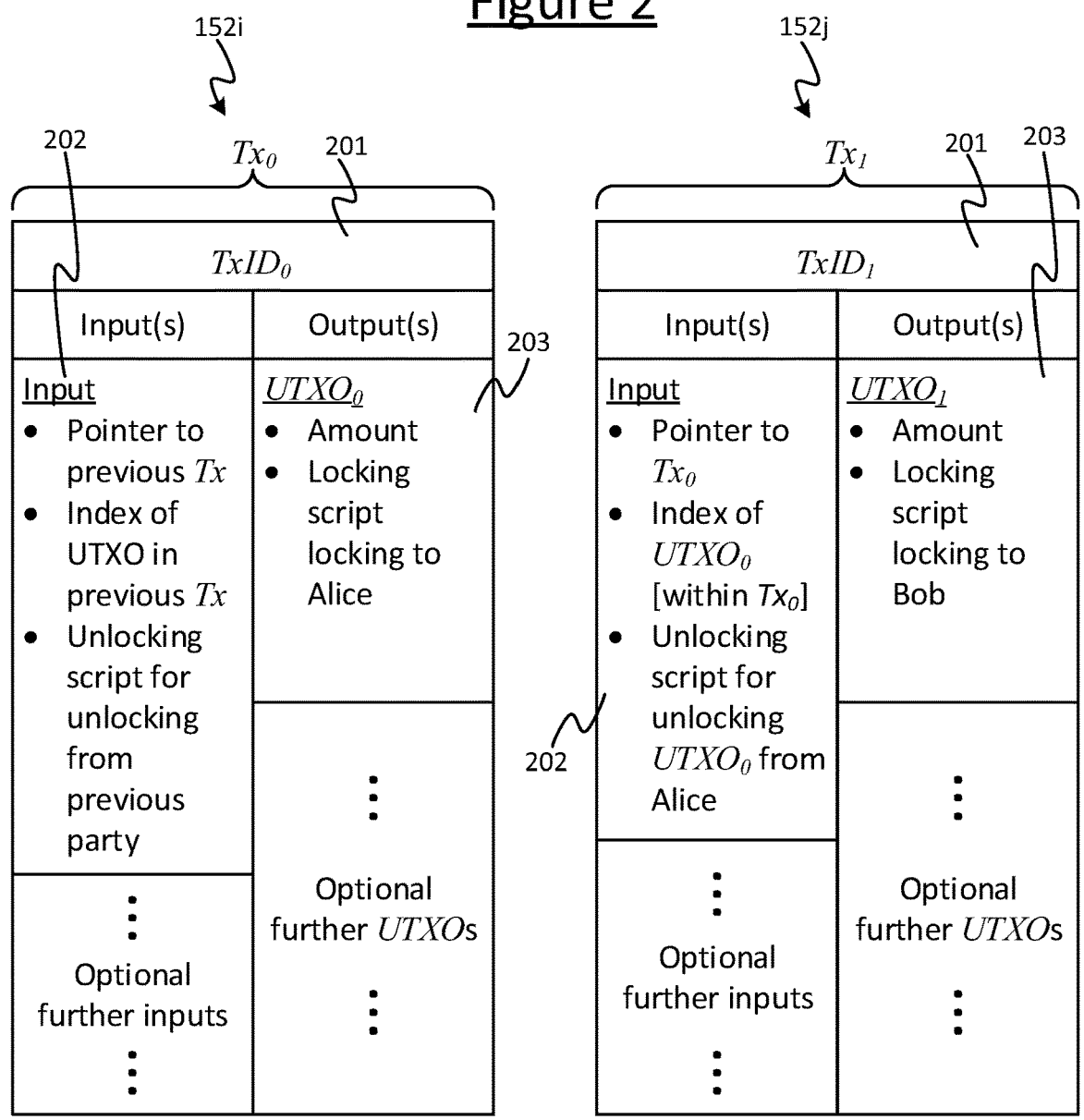
FIG. 2 schematically illustrates some examples of transactions which may be recorded in a blockchain.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$. which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
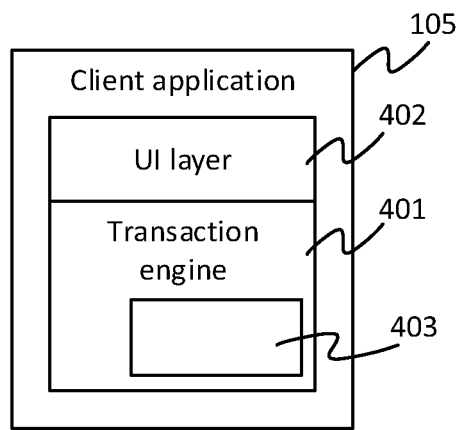
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
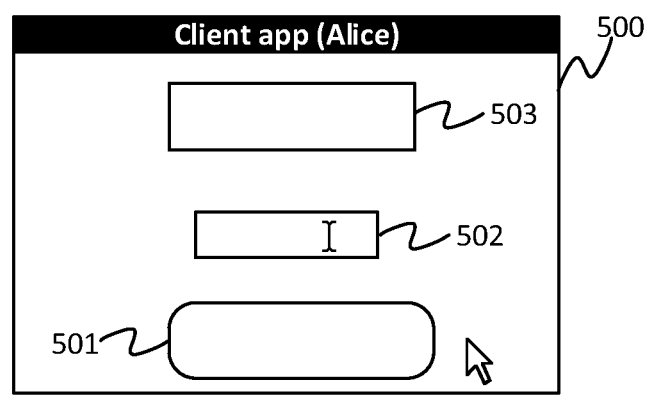
FIG. 3B is a schematic mock-up of an example user interface that may be presented by the client application of FIG. 3A, FIG. 4 schematically illustrates the tree-like structure of keys in an HD wallet, FIG. 5 schematically illustrates the generation of a child extended private key and chain code, FIG. 6 schematically illustrates an example child key derivation function for an HD wallet, FIG. 7 schematically illustrates an example system for generating child keys, FIG. 8 schematically illustrates a path conversion process, FIG. 9 schematically illustrates a key-derivation process that happens subsequent to path-conversion, FIG. 10 schematically illustrates a path-obfuscation process, FIG. 11 schematically illustrates a process flow from data path to generated key set, and FIGS. 12a and 12b schematically illustrate an example process to encrypt and broadcast data.
Figure 4:
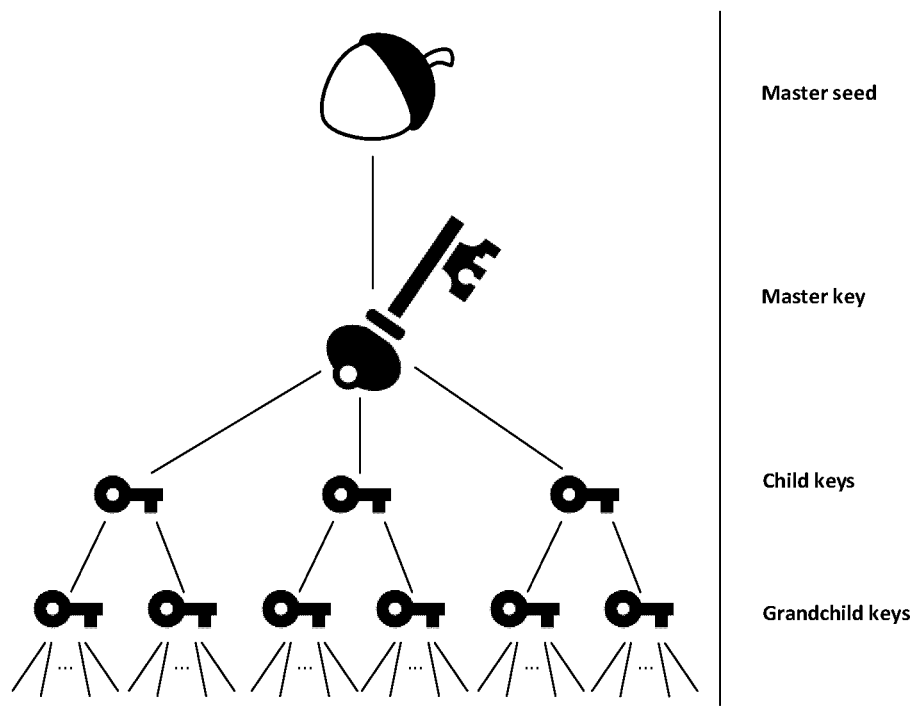

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to select messages to be used when generating child keys according to embodiments.

Alternatively or additionally, the UI elements may comprise one or more data entry fields 502, through which the user can enter messages to be used when generating child keys according to embodiments. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

HD Wallets
BIP32

The HD wallet protocol according to the BIP32 specification details two core mechanisms:
1. Key derivation—a system for deriving a tree of keypairs from a single seed.
2. Derivation path—defines the wallet structure on top of such a tree.

The following provides an overview of the steps involved in the creation of a HD wallet according to the BIP32 protocol. See https://github.com/bitcoin/bips/blob/master/bip-0032.mediawiki for a complete discussion.

Key Derivation

I. Generate a binary seed. The user first chooses a seed, S, normally a 12-word phrase (between 128 to 512 bits). The specification outlined in BIP39 is commonly employed to generate a binary seed from a mnemonic code. The user may also decide to protect their mnemonic with a passphrase (see BIP39 for further details).

II. Generate a master extended private key. The master private key m is derived from the seed as follows:

1. Calculate $I$=HMAC_SHA512(Key="Bitcoin seed", Data=$S$)=$H((Key \oplus opad) \| H((Key \oplus ipad) \| S))$, where opad is 128-byte sized outer padding, consisting of repeated bytes valued 0x5c and ipad is 128-byte sized inner padding, consisting of repeated bytes valued 0x36.
2. Split I into two 32-byte sequences, $I_L$ and $I_R$.
3. Use parse256($I_L$) to interpret the 32-byte sequence as a 256-bit number (most significant byte first) master extended private key m and $I_R$ as a 256-bit number master chain code.

III. Generate a child extended private key. Given a parent extended key and a key index i, we can compute the corresponding child extended key. Refer to BIP32 for additional CKD functions to derive public child keys from public and private parent keys. Child private keys $sk_i$ are derived from parent private keys $sk_{par}$ and their corresponding chain code c par using the function:

$$CKD_{priv}((sk_{par}, c_{par}), i) \rightarrow (sk_i, c_i). \quad (3)$$

The following steps take place when executing the function $CKD_{priv}$:
1. Check whether the key index $i \geq 2^{31}$ i.e., whether the child is a hardened key.
    i. If yes=>hardened child, use the function:

$I$=HMAC_SHA512(Key=$c_{par}$,Data=0x00$\|$ser$_{256}$($sk_{par}$)$\|$ser$_{32}$(i)), where ser$_{256}$ ($sk_{par}$) serializes the integer $sk_{par}$ as a 32-byte sequence and ser$_{32}$ (i) serializes a 32-bit unsigned integer i as a 4-byte sequence, most significant byte first.
    ii. If no=>normal child, use the function:

$I$=HMAC_SHA512(Key=$c_{par}$,Data=ser$_P$($sk_{par}$·G)$\|$ser$_{32}$(i)), where ser$_p$($sk_{par}$ G) serializes the coordinate pair $sk_{par}$·G=(x, y) as a byte sequence using SEC1's compressed form: (0x02 or 0x03)$\|$ser 256 (x), where the header byte depends on the parity of the omitted y coordinate.
2. Split I into two 32-byte sequences, $I_L$, and $I_R$.
3. The returned child key $sk_i$=parse256($I_L$)+$sk_{par}$(mod n).
4. The returned chain code $c_i$=$I_R$.

Figure 5:
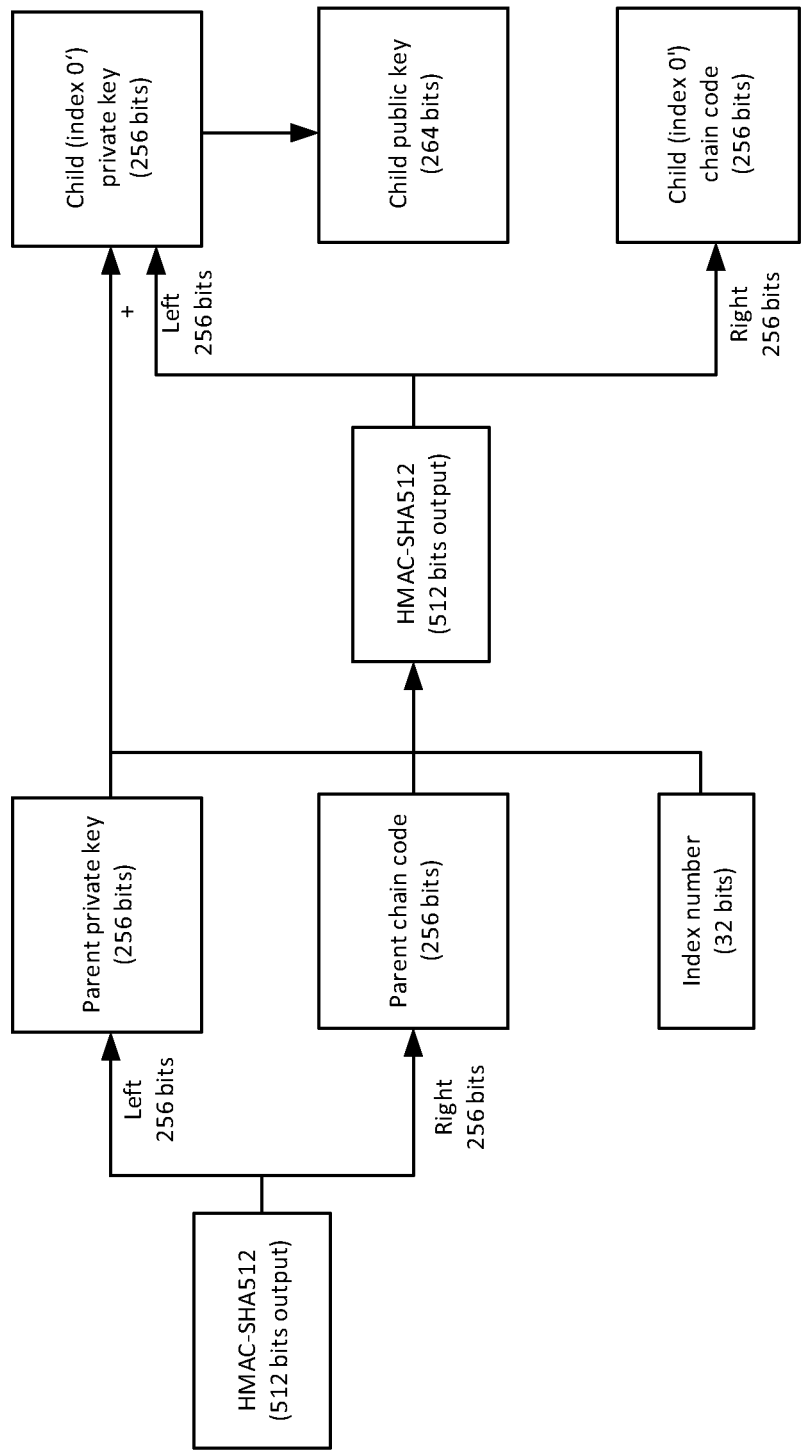

This process is illustrated schematically in FIG. 5.

IV. Serialize extended key format. An extended public (xpub) or private (xprv) key is the base58 encoded serialization of a 78-byte data structure:

[magic][depth][parent fingerprint][key index][chain code][key]

A description of the individual data elements is summarized in Table 1.

Note that the parent fingerprint is a fast method to detect parent and child nodes in wallet software. Internally, the full 160-bit identifier could be used to deal with any hash collisions in the fingerprint.

TABLE 1

The data elements used in the base58 encoded serialization of the extended key.

| Data | Size | Type | Description |
| --- | --- | --- | --- |
| Magic | 4 bytes | uint32_t | A version number that indicates the network it belongs to and whether the key is public or private.<br>Mainnet (x): 0x0488B21E public ("(xpub)")<br>0x0488ADE4 private ("(xprv)")<br>Testnet (t): 0x043587CF public ("(tpub)"),<br>0x04358394 private (tprv). |
| Depth | 1 byte | uint16_t | A number that indicates how deep an xprv or xpub is in a derivation path. It is incremented by one for each level in the path up to a maximum of 0xFF.<br>Master nodes: 0x00<br>Level-1 derived keys: 0x01<br>Level-2 derived keys: 0x02, . . . |
| Parent fingerprint | 4 bytes | uint32_t | The first 4 bytes of the hash160 of the public key of the parent.<br>Master key: 0x00000000 |
| Key index | 4 bytes | uint32_t | The child number, which is used to distinguish between normal versus hardened keys, with prepended zeros. This is $ser_{32}(i)$ for index i in $x_i = x_{par}/i$, with the key $x_i$ being serialized.<br>Master key index: 0x00000000<br>Maximum key index: 0xFFFFFFFF |
| Chain code | 32 bytes | char | An extra 256 bits of entropy extending both private and public keys in order to prevent child keys from depending solely on parent keys. |
| Key | 33 bytes | char | A public or private key. Private keys are prepended with a single 0x00 byte so that the length stays the same as public keys.<br>Public key (pk): $ser_P(pk)$<br>Private key (sk): 0x00 \|\| $ser_{256}(sk)$ |

A 32-bit checksum (derived from the double SHA-256 checksum) is first added before converting to the base58 representation, which results in a string of up to 112 characters starting with either "xprv" or "xpub" on mainnet, or "tory" or "tpub" on testnet.

When importing a serialized xpub, implementations must also verify whether the X coordinate in the public key data corresponds to a point on the curve. If not, the extended public key is deemed invalid.

Derivation Path

The 32-bit key indexes i range from 0x00 to 0x7fffffff (0 to $2^{31}-1$) for normal keys, and 0x80000000 to 0xffffffff ($2^{31}-2^{32}$) for hardened keys. The subscript notation (i h) or, more commonly, the prime symbol is used to indicate hardened keys. Blockchain developers typically use the ASCII apostrophe rather than the unicode prime symbol. For example, the first normal key (0x00) is i=0 and the first hardened key (0x80000000) is i'=0'.

Figure 6:
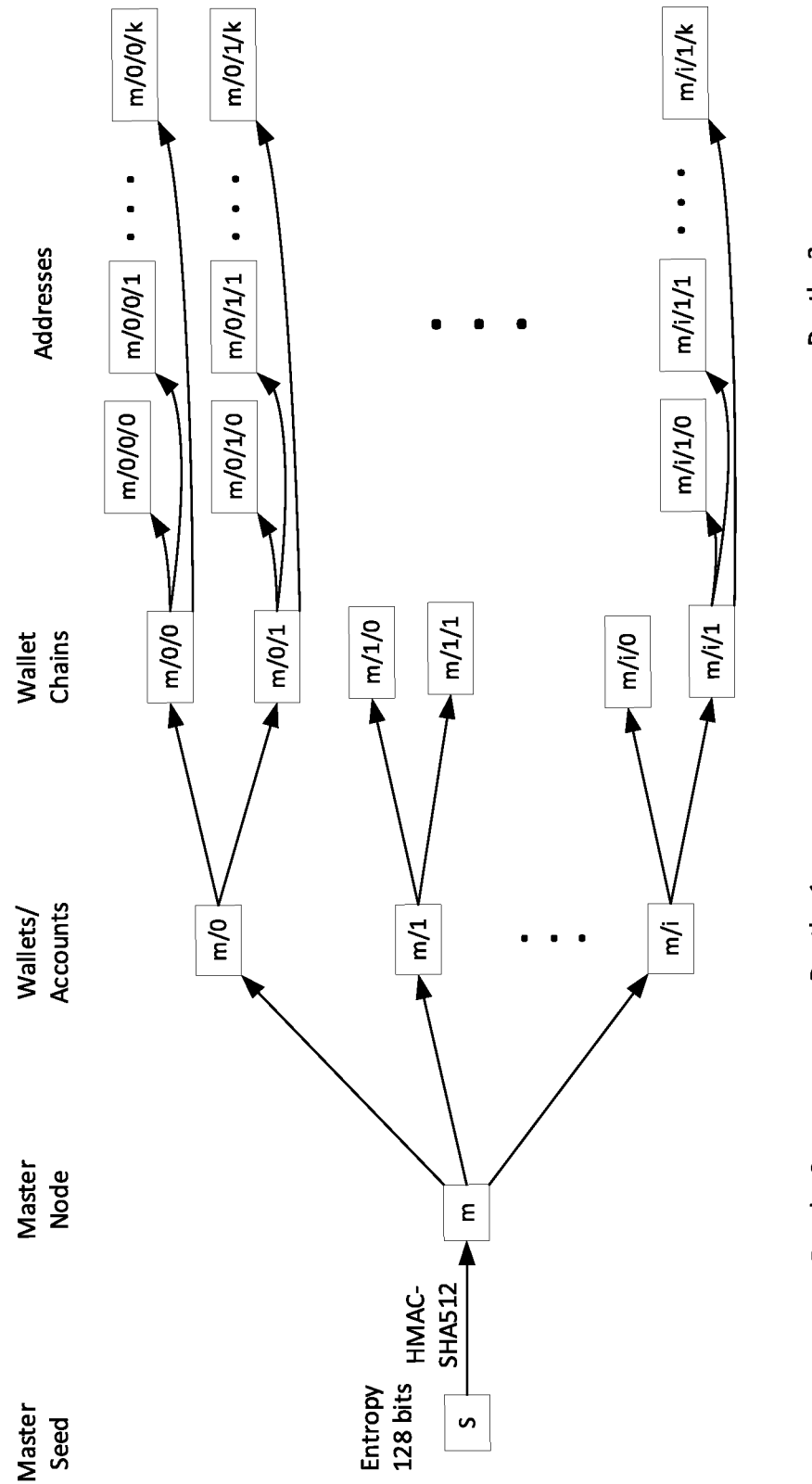

FIG. 6 illustrates the child key derivation path in the schematic taken from the BIP32 specification. The derivation path is defined as an n-tuple of n key indexes separated by '/'. For BIP32 HD wallets, the path consists of 3 levels or depths (m/i/j/k) and is defined as:

m/account'/change/address_index

The first level i after the master private key m encompasses the disclosed BIP32 wallet structure. Here the key space can be split so that the user can organise their funds into different 'accounts' in analogy with traditional bank accounts e.g., for different divisions of an organization. The default account is number 0' (hardened key index) and is increased sequentially.

In the second level j, each account is composed of two keypair chains: an internal and an external one. The external keychain (a constant index of j=0) is used to generate new public receiving addresses, while the internal keychain (a constant index of j=1) is used for all other operations, such as change addresses or anything that does not need to be communicated externally.

The final level k denotes the addresses that are numbered from index 0 and increase sequentially.

BIP43—Purpose Field

The BIP43 specification (https://github.com/bitcoin/bips-iblob/masteribip-0043.mediawiki) was introduced to standardise the fields in the tree-structure defined in BIP32. Specifically, it redefines the first level following the master key as a special purpose field. The derivation path is defined as:

m/purpose'/* where * denotes the following levels depending on the data in the purpose field. If this is set to zero (i=0'), we can expect there to be two more levels in the derivation path since this is the default BIP32 wallet structure.

BIP44—Multi-Account Hierarchy

An application of BIP43 in which the purpose field is set to 44' corresponds to a pre-defined five-tier tree structure in accordance with BIP44 (https://github.com/bitcoin/bips-iblob/masteribip-0044.mediawiki). Specifically, it introduces the handling of multiple coins within different branches of a HD wallet, with the default value being assigned to bitcoin (j=0'). Here, the derivation path is defined as:

m/purpose'/coin_type'/account'/change/address_index

Address Gap Limit

BIP44 introduces the concept of an address gap limit for the purposes of account discovery. A wallet's software can be programmed to stop searching for consecutive unused addresses beyond a certain limit. This is because the address index is increased sequentially. The gap limit is not standardized and is often be user configurable. Conventionally, it is set to 20 keys, although some wallets set a limit of 100 or even 1000 keys. Note that the gap limit only applies to sibling keys rather than parent-child keys. The search is often limited to 2 levels deep assuming that a standard derivation path is used.

Account Discovery:

When a user imports their seed from an external source, a wallet's software can use the address gap limit to discover accounts in the following manner:

1. Set index=0.
2. Derive the account's node corresponding to the index.
3. Derive the external chain node of this account.
4. Scan addresses of the external chain; respect the gap limit.
5. If no transactions are found on the external chain, stop discovery.
6. If there are some transactions, increase the account index by one and repeat from step 2.

Since internal chains only receive coins that come from the associated external chains, the scan of the blockchain involves external chains only. Wallet software should warn when the user is trying to exceed the gap limit on an external chain by generating a new address.

Wallet Recovery

Different wallet providers have different protocols in place to recover funds during wallet restoration. Companies who offer HD wallet services to exchanges can easily have thousands of unused consecutive addresses and generally ignore the gap limit proposed in BIP44. They instead maintain a list of all generated addresses and index them individually rather than as a HD wallet data structure. Maintaining a cache of known transactions in this way removes the need to re-query the blockchain every time a user logs in to the software, making the process more time efficient while also allowing lightweight clients to scale-up their user capacity with just a handful of nodes.

Wallet providers that track UTXOs/entire transactions tend to store this information in a wallet server. HD wallets relying on a full node can maintain a full index of transactions, while a system of servers is likely to keep a running index that is appended to with each new address. For every block that is published, the wallet software will check each transaction in the new block against each address in the wallet server. This process is made more efficient using pre-indexed data and/or with the help of bloom filters.

Generating Child Keys

Embodiments of the present invention provide a novel way of generating child keys of a hierarchical key structure. In general the hierarchical key structure comprises a plurality of levels, with each level comprising one or more keys that are linked to at least one key of a preceding level. An exception to this is the very first level, normally referred to as the master level, which comprises a master key. The master key is typically derived from a seed which may be any arbitrary data. After the master level there are one or more child levels. A key in the n−1th level may be a parent key of one or more child keys in the nth level. Similarly, a key in the nth level, whilst being a child key of a parent key in the nth level, may also be a parent key of one or more child keys in the n+1th level. Not all keys in a given level must be a parent key. For instance, the key structure may have many branches of keys that trace back to the master key. Some branches may be longer than others, meaning that those branches include keys belonging to a level higher (i.e. greater, further or deeper) than other branches.

Figure 7:
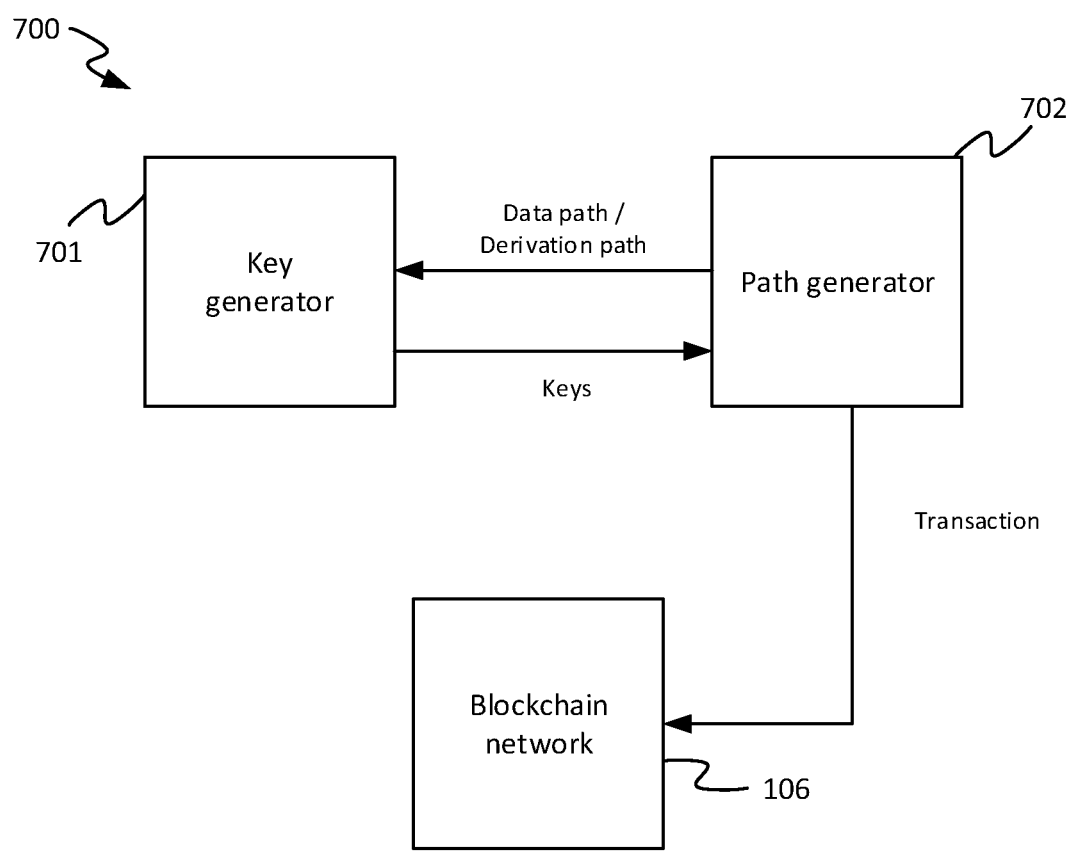

FIG. 7 illustrates an example system 700 for implementing embodiments of the present invention. The system comprises a key generator 701 configured to generate one or more child keys of a key structure. Whilst BIP32 is provided as an example protocol for generating a key structure, the key generator 701 is not restricted to generating keys that conform to that protocol. For instance, the length of keys generated by the key generator 701 may differ from that required by BIP32. Conversely, the key generator 701 may generate keys that do conform to BIP32 in every requirement. Moreover, the keys generated by the key generator 701 need not be generated for the purpose of being used as signing keys for signing blockchain transactions or as public keys for use as blockchain addresses, e.g. for pay-to-public-key hash (P2PKH) addresses.

Put another way, although the following will be described although embodiments herein are described in terms of an example application to the BIP protocols, more generally the principles disclosed herein can be applied to any hierarchal key derivation protocol whereby one or more levels of child keys are derived from parent keys.

The key generator 701 may be a stand-alone function or entity, or the key generator 701 may be comprised by a different entity, e.g. Alice 103*a* or Bob 103*b*. The system 700 may also comprise a path generator 702. Whilst shown separately from the key generator 701, the path generator 702 may instead by a component of the key generator 701, e.g. a single entity may perform the actions attributed to the key generator 701 and the path generator 702.

The system may also comprise one or more nodes 104 of a blockchain network 106. Additionally or alternatively, the system may comprise one or more third parties, e.g. users such as Alice 103*a* and Bob 103*b*, organisations, machines, etc., whose optional roles will be discussed below The key generator 701 has an existing key structure that comprises at least one parent key. The parent key may be the master key, or a child key belonging to a deeper level (e.g. a child key of the master key). Alternatively, the key generator 701 generates a key structure for the first time, wherein the generated key structure includes at least one parent key. The key structure is generated based on a seed. Specifically, the master key is generated based on the seed, and all other keys are derived, at least indirectly, from the master key.

The key generator 701 obtains a child key derivation (CKD) path. The CKD path may be generated by the key generator 701 (as will be explained below), or it may be received from a path generator 702. The CKD path comprises a sequence of elements. The sequence of elements is made up of one or more groups, or sets, of elements. In some examples the groups may be somehow distinguished, or in other examples it may not be possible to tell from the elements alone how they are divided up into groups. For the purpose of merely generating keys it is not important if the individual groups are recognisable. Each element in the CKD path is generated based on a data item. That is, each element is a function of a data item. The data items belong to a data path, which will be described below. Each group of elements is generated based on the same data item, with different groups being generated based on different data items. The key generator 701 may or may not know how the elements have been generated. Again, for the purpose of generating keys it is not important if the key generator 701 is aware of how the elements have been generated.

Each element in the CKD path corresponds to a position of a key to be generated in the key structure. Having obtained the CKD path, the key generator 701 generates a respective key at positions corresponding to the elements in the CKD path.

For instance, the CKD path may comprise four elements (m/i/j/k)=(m/2/1/3). The key generator 701 would generate a key in positions in the key structure corresponding to those elements. In some examples, the key generator 701 may have access to at least one of those keys and therefore need not re-generate those keys, e.g. the key generator 701 may store the master key m. In this example, the key generator 701 would generate the following keys: m/2, m/2/1, and m/2/1/3. Key m/2/1/3 is a child of key m/2/1, which is a child of key m/2/, which is a child of key m. Note that m/2/1/3 is not actually a key, but rather it indicates a position of a key in the key structure. The skilled person will be aware that key m/2/1/3 can only be generated if the parent key, grandparent key and master key have been generated.

Having generated the child keys based on the CKD path, the key generator 701 may store those keys and/or output those keys. The key generator may store or output only some of those keys. Outputting a key may comprise sending the key to a third party, and/or outputting the key to a function controlled by the key generator 701 or by an entity comprising the key generator 701. The key generator 701 may receive an indication of which keys to output, e.g. indices corresponding to elements in the sequence. That is, a third party (such as the provider of the CKD path or data path) may request keys corresponding to the third, seventh and thirteenth elements in the CKD path.

The skilled person will be familiar with public-private key pairs. Briefly, a public key is generated by applying a function to a private key, e.g. elliptic curve multiplication of a generator point. The key generator 701 may use the described techniques to generate private keys or public keys.

In some examples, the parent key used to generate the child key is a private key. The resulting child key is also a private key. Such keys are often referred to as hardened keys and may be given by:

$$sk_{child}=sk_{parent}+\text{HMAC-SHA512}_L(c_{parent},sk_{parent}\|\text{index})$$

Note that the hash function may take other forms.

In other examples, the parent key used to generate the child key may be a public key. In this case, the child key is generated based on the parent key and a public key corresponding to the hash result. That is, the hash result is converted into a public key, and the child key is based on that public key, e.g.:

$$pk_{child}=pk_{parent}+\text{HMAC-SHA512}_L(c_{parent},pk_{parent}\|\text{index})\cdot G$$

Where $\cdot G$ denotes elliptic curve multiplication by a generator point.

In yet other examples, the parent key outside of the hash function may be a private key, whilst the parent key input to the hash function may be a public key. The resulting child key is a private key. Such keys are often referred to as non-hardened keys and may be given by:

$$sk_{child}=sk_{parent}+\text{HMAC-SHA512}_L(c_{parent},pk_{parent}\|\text{index})$$

The key generator 701 may generate a public key corresponding to the child private key, e.g.

$$pk_{child}=sk_{child}\cdot G$$

Rather than being keys of an asymmetric cryptography scheme, the keys may instead be keys of a symmetric scheme.

In general the child key(s) generated by the key generator 701 may be output for use by any suitable application, e.g. encryption and decryption of messages. E.g. a child public key may be used to encrypt a message, or a child private key may be used to decrypt a message that has been encrypted with the corresponding child private key. In the case that the child key is a symmetric key, the same child key may be used to encrypt and decrypt messages.

The child key may also be used to generate digital signatures. That is, the child key may be a private key used to generate a digital signature based on a message and the private key. The signature may be verified using the corresponding public key.

One application that the child key may be used for is in the context of blockchain transactions. For instance, the child key may be a public key to which an output of a blockchain transaction is locked, e.g. using a P2PK or P2PKH output. The key generator 701 may generate a transaction comprising an output that is locked to the child key. Alternatively, the key generator 701 may provide the child key to a third party, and that third party may generate a transaction comprising an output locked to the child key. The key generator 701 may provide the third party with the child key itself, or with a blockchain address based on the child key, e.g. a hash of the child key. Note that generating the transaction may comprise generating a transaction template that is missing at least one field. The transaction template may be passed to the third party or the key generator 701 for completion, depending on who generated the transaction template. The complete transaction may then be transmitted to the blockchain network 106.

If the blockchain comprises a transaction locked to a child public key, the key generator 701 may generate a transaction comprising an input that references and is configured to unlock that output. The input may comprise a signature generated using the corresponding child private key. Depending on the locking script of the referenced output, the input may also comprise the child public key.

The key generator 701 may send one or more of the plurality of child keys to a third party. The key generator 701 may additionally or alternatively generate a respective blockchain address for each of the plurality of child keys, and send those addresses to the third party. The addresses may be included in one or more transaction templates, e.g. one template for each address.

The key generator 701 may generate one or more blockchain transactions (which may be transaction templates), each having at least one output locked to one of the generated child keys. Each transaction may comprise a single output locked to a respective one of the child keys, or one or more transaction may comprise more than one output locked to a respective one of the child keys. The key generator 701 may send the transactions to the blockchain network, or to a third party.

Returning now to the CKD path, the CKD path may comprise one or more sub-paths. There may be one sub-path for each group of elements of the CKD path, or equivalently, one sub-path for each data item of the data path. Each sub-path of a given CKD path starts with the same element, i.e. the initial element in the sequence, and ends with a respective "terminal element". In other words, the terminal element is the end (i.e. final) element in the sub-path. Each element in the CKD path belongs to a different level, and each sub-path ends with a terminal element belonging to a different level in the sequence, termed herein the "terminal level". For example, the terminal element of one sub-path may belong to the third level in the sequence, whilst the terminal element of another sub-path may belong to the sixth level in the sequence.

Each ending element corresponds to a position of a key at a different level of the key structure. Therefore the more elements in a given sub-path, the greater the level (i.e. depth) of that key, assuming that the levels increase from an initial value, e.g. zero. The key generator 701 may, in some examples, store and/or output only the keys that correspond to the end of these sub-paths. This means that the key generator may store and/or output one key per data item. Using the example above where the CKD path comprises four elements (m/i/j/k)=(m/2/1/3), the CKD path may comprise two sub-paths (m/i/j) and (m/i/j/k). Both sub-paths start with the same element m, but end in terminal elements at different levels, j and k respectively. The key generator may store and/or output the two keys corresponding to the two sub-paths. Note that although the terminal elements of the sub-paths end at different levels, the actual values of the terminal elements may be the same.

As mentioned briefly above, the CKD path may be generated by an entity other than the key generator, e.g. the path generator 702. Alternatively, the key generator may generate the CKD path based on the data path.

The data path comprises one or more data items. The CKD path is generated by converting each data item into a group of elements which represent a given data item. In some examples, a given data item may be converted, or mapped, to a single element. In some examples, a given data item may be converted to multiple elements which together represent that data item. Put another way, a given group of elements encodes a given data item.

One particular way of converting a data item to one or more elements is to generate a number of fixed-length integers (i.e. fixed bit length) which together encode the data item. For example, each element may be a 31-bit or 32-bit integer. Take the example of a 31-bit integer, a data item may be 31-bits or less in size, in which case that data item may be represented by a single element. Alternatively, a data item may be greater than 31-bits in size, in which case multiple elements are required to represent that data item. In general, the number of elements, n, required to represent an element is given by n=d/i, where d is the bit-length of the data item and i is the bit-length of the element. In some key structures, including BIP32 wallets, a parent key can have at most 2' child keys. In that case, the fixed-length integer is at most n-bits.

In the embodiments where the key generator 701 generates the CKD path based on the data path, the data path may either be received from a different entity or generated by the key generator 701. For instance, the key generator may construct a data path based on a particular set of data items that correspond to a folder structure. That is, the data items may have an inherent structure. Alternatively the key generator may arrange the data items into a structure for generating the data path.

Optionally, the data path that is used to generate the CKD may be an obfuscated version of a non-obfuscated data path. That is, the data items of the original, non-obfuscated data path may be obfuscated. The elements of the CKD are then generated based on the obfuscated data items. The key generator may receive the obfuscated data path instead of the data path. Alternatively, the key generated may receive the original data path and obfuscate the data items before generating the CKD. In some examples, each data item is obfuscated separately.

As shown in FIG. 7, the path generator 702 may be distinct from the key generator 701. In these embodiments, the path generator 702 is configured to generate the CKD based on the data path, and output the CKD to the key generator 701. The data path may be received from a third party, e.g. a user such as Alice 103a. The path generator 702 generates the CKD using the techniques described above.

Further specific examples of the described embodiments will now be discussed.

In many data-oriented blockchain applications, the data that is packaged in blockchain transaction and recorded on the blockchain 150 often is part of a larger data structure defined by the application logic itself.

The key-derivation process used to generate the keys used to sign these transactions is usually independent of this over-arching data structure, which means that the application must monitor and track not only the structure associated with its own database, but also the hierarchical structure of keys used to sign the related blockchain transactions.

In this section, we describe a key-derivation protocol that aims to unify these two structures, whereby the database structure is incorporated into the key-derivation mechanism. This broadly involves two stages:

Path-conversion—the stage where a data path, based on the database structure, is converted into a key-derivation path compatible with the BIP-32 standard.

Key-derivation—the stage where a converted path is then used to generate a set of keys to be used for signing, encryption or other purposes.

Following the base description of these two stages, we also prescribe an optional pre-processing stage of path-obfuscation, whereby the data path based on the database structure is obfuscated prior to the path-conversion process such that whoever is responsible for performing the path conversion gains no information about the database structure itself. This is useful for applications that may invoke a third-party service provider to perform the steps of path conversion and key-derivation.

Path Conversion

The first stage of the method is path-conversion. In this stage, the application selects a piece of data that is to be included in a blockchain transaction and recorded on the blockchain (e.g. a blockchain-based twitter application).

The application will also generate the corresponding data path for that data item, which will be determined by the data structure used by that application. For the example of a blockchain-based twitter, the data path may be of the form BitTweet/AliceID/PostID/CommentID/Timestamp, which would correspond to the data item being a comment made by a user Alice on a particular post on the blockchain twitter application 'BitTweet'. This data path is also analogous to the folder and file structure found on personal computers.

The application then performs a path conversion to generate a derivation path, as shown in the table below.

| Type | Data |
|---|---|
| Plaintext data path | App/UserID/Post/Comment/Time |
| Raw derivation path (truncated) | 0/6/.../2/0/42/4/.../7 |
| Raw derivation path (full) | 0/6/300/5/1945/3/2/0/42/4/68/495/31/7 |

3. Create the derivation path:
   1. For each element concatenate each of its chunks as: "Chunk1"+"Chunk2"+ . . .
   2. Concatenate the sub-paths generated in 3.1 as: "Elm1Chunks"+"Elm2Chunks"+ . . .

Note that + here means concatenation.

Figure 8:
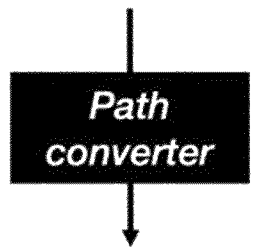

This process will result in a key derivation path corresponding uniquely to the supplied data path, and the overall effect of this process is shown in FIG. 8. This process may be performed by a specialised 'path converter' entity.

Deriving Keys from Converted Paths

Given that we have converted a data path into a key-derivation path, we are now able to use that derivation path to generate a set of keys. These keys may be used to perform any cryptographic operation related to the data, such as encrypting the data or signing transactions containing the data to then be recorded on the blockchain.

| Type | Data |
|---|---|
| Plaintext data path | App/UserID/Post/Comment/Time |
| Raw derivation path (truncated) | 0/6/.../2/0/42/4/.../7 |
| Raw derivation path (full) | 0/6/300/5/1945/3/2/0/42/4/68/495/31/7 |
| Derived key set | L5i89WEgzu7vRbPY7Gzs5Rbj23Ya5w2ZEfMmNKzuiZH9yh8t3toh, KwJgeyjjjaMXYUYdE8Cv66CVcHfigkX5nmmUibQvJcwbt9SWd1B2, L4SbJkCgWCmsfH3Gg9eJ7Kqit6vWrwdKHarZgPDPLENmD3CQzaQL, KyURMaEFyA9QxnVo4w6KwErmDsjiadWQS8i97cSkGVGLvDELWFkr, KyxgQMoEcNXns7T8WZ64v82SQBE7jSNgdtCqFfQkNuDh45E5AaVn |

The table above shows an example of how a data path, which may be in a simple text-based form such as ASCII-encoded, can be converted into a key derivation path consisting only of numbers or indices.

A key aspect to note here is that, in order to be compatible with the BIP-32 key-derivation path format as laid out in section 2.1, each index in the derivation path must be 31 bits in size (or 32 bits if hardened keys are to be included). This must be accounted for when converting each element of the data path into corresponding elements of the key derivation path.

For the example shown in the table above, we have assumed that the UserID is 180 bits in length. This means it requires $\lceil 180/31 \rceil = 6$ indices in total to create a sub-path 6/300/5/1945/3/2 of the derivation path that uniquely corresponds to the UserID element of the data path. Note that the indices in this sub path 6, 300, 5, 1945, 3, 2 are simply the decimal representations of 31-bit integers here.

The key observation here is that any given element of the data path may result in multiple elements in the key derivation path. This is crucial to ensuring that each data path, which corresponds to a unique data item, will also correspond to a unique derivation path. The importance of this point will be made clear in section 3.2 when we use the derivation path to derive these keys.

An example implementation of this path-conversion process, performed by an application, is as follows:
1. Select a data item, and its corresponding data path.
2. Split each element of the data path into chunks, each 31 bits in length.

As is shown in the table above, we have only chosen to generate one key from each of the longer sub-paths corresponding to the UserID and Time fields respectively.

We adopt the convention that:

Exactly one key is derived for each element in the data path.

The reason for this is that we wish for each key derived from the original data path to be unique to that data path. This is why we derive a key based on the entire path, which is dependent on all the chunks of data taken from the data path as described in the previous section.

If we were to derive keys for intermediate components of these sub-paths, we may find that we generate the same key using different (e.g.) UserID data. For example let us say that we have two data paths of the following form:

App/UserID1/Post/Comment/Time
App/UserID2/Post/Comment/Time and corresponding full derivation paths:

0/6/300/5/1945/3/2/0/42/4/68/495/31/7
0/6/300/5/2000/4/6/0/42/4/68/495/31/7

If were to derive a key for each of these to paths only using the indices up to and including the 4th index position, we notice that the path is identical 0/6/300/5, despite being partially based on two different user's unique IDs. This will have the consequence of also causing the same key to be derived for the two users.

This motivates the use of the full sub-path when generating a key based only on the first two data path elements App/UserID, which would now correspond to the sub-path of up to and including the $6^{th}$ index in the derivation path. This would result in two unique keys, derived from the two unique paths:

0/6/300/5/1945/3/2
0/6/300/5/2000/4/6

Figure 9:
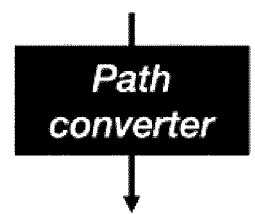
Figure 9:
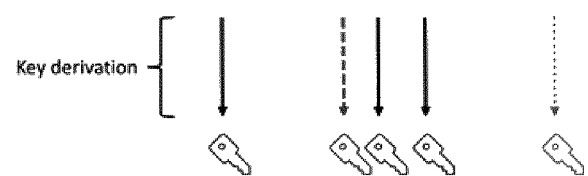

This key-derivation convention for use with the path-conversion protocol is visualised in FIG. 9.

Obfuscating the Conversion Process

In applications where the path-conversion and key-derivation functions may be offloaded to third-party service providers, we may wish to add an additional stage to the path-conversion process whereby the plaintext data path itself is obfuscated prior to its use in the path-conversion.

| TxID | |
| --- | --- |
| Input | Output |
| < Sig P> <P> | OP_RETURN <Enc(Data, {$k_1, k_2, \ldots, k_5$})> |

| Type | Data |
| --- | --- |
| Plaintext data path | App/UserID/Post/Comment/Time |
| Obfuscated data path | gH3/a4eR9f/tJ2c/qem5K1v/2f8H |
| Raw derivation path (truncated) | 0/3/.../7/0/42/1/.../4 |
| Raw derivation path (full) | 0/5/23/691/1/34/1/63/470/12/8/67/1/58 |
| Derived key set | KwQmrqXkc4VhF3yk573VYFzDD1PUFT2Xu8aEcv5FfXDVkUcaSfoi, KyMd5X3icBNzvw262Doqgq7Lzb6H13YTXQZLLqMYypcew5aCdbDk, L4AQHE9umVRmUZcttTDTQs1fKYZHXYiLnw1Dqz4d4gYSPY4yV94q, L3paA1noCc1E5ooj1nVz79C7jPpf1z9kG3ug1UQhf9mLtpFPmFWj, K45Ezswn1GuTC9veTTDa1x7uWBFTciH7PLQazq7x8g9r9xESFkh8 |

This additional step of obfuscation is performed before invoking the path-conversion operation, and will result in the path-converter operating on the obfuscated data path, as opposed to the original form of the data path. The major advantage of introducing the obfuscation step here is that it ensures the path conversion and key-derivation processes, as well as the eventual inclusion of the blockchain transaction on the blockchain, does not leak any information about the structure of the data of the application. This allows for completely private, but more efficient management of blockchain transactions that include application data.

Note that the derivation path, and consequently the derived key set, are different from those based on the initial data path due to the effect of obfuscating the data path.

The actual obfuscation operation performed on the original data path should be performed element-wise on the elements of the data path, and could include any of the following processes:

Randomisation;
XOR encryption with a secret XOR key;
Substitution using a mapping function;
Encryption; and/or
Use of a hash function.

Figure 10:
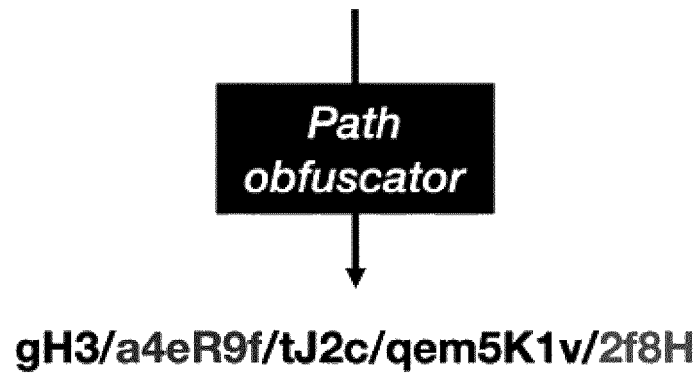
Figure 11:
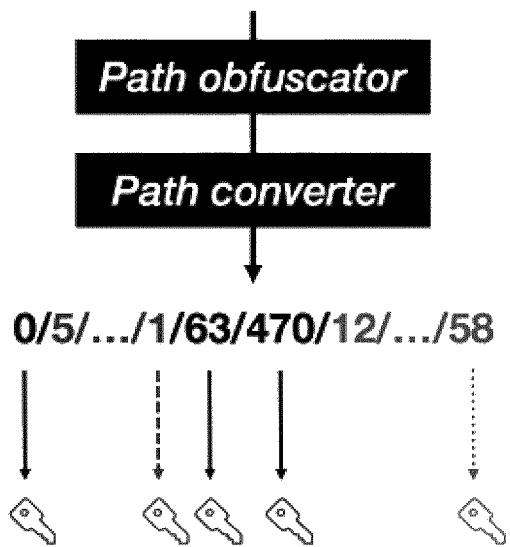

FIGS. 10 and 11 the path-obfuscation step in action. FIG. 10 shows the path obfuscation process, as performed by a path-obfuscator entity, such as third-party service provider, visualised as a black box. FIG. 11 contextualises the use of a path obfuscator within the overall process flow from choosing a data path to key generation.

Example Use Case: Encrypted Data Transactions

Consider a scenario where Alice, the owner of an application, wishes to record her application data on the blockchain 150 but does not have the technical expertise to implement encryption of her own data, or to correctly generate blockchain transactions. Alice wishes to use the services of a third-party, Bob, to help with these functions. Note that Alice and Bob are just used here as convenient labels and do not necessarily imply that they perform the same roles as Alice 103a and Bob 103b as described above, although that is not excluded.

The end goal is to generate blockchain transactions of the form shown in the table below, where her data is encrypted a total of five times using a key set $k_1, k_2, \ldots, k_5$.

Figure 12A:
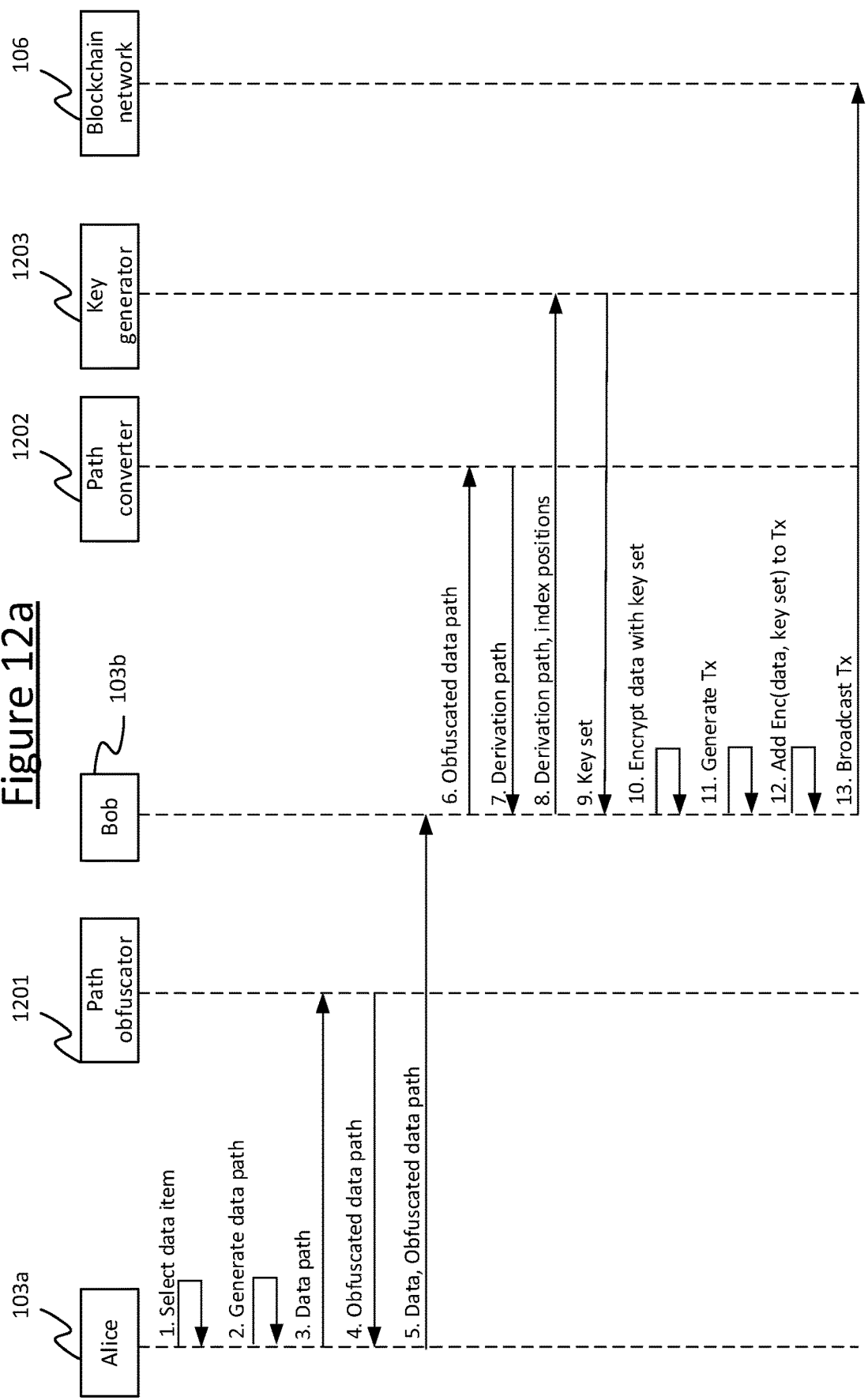
Figure 12B:
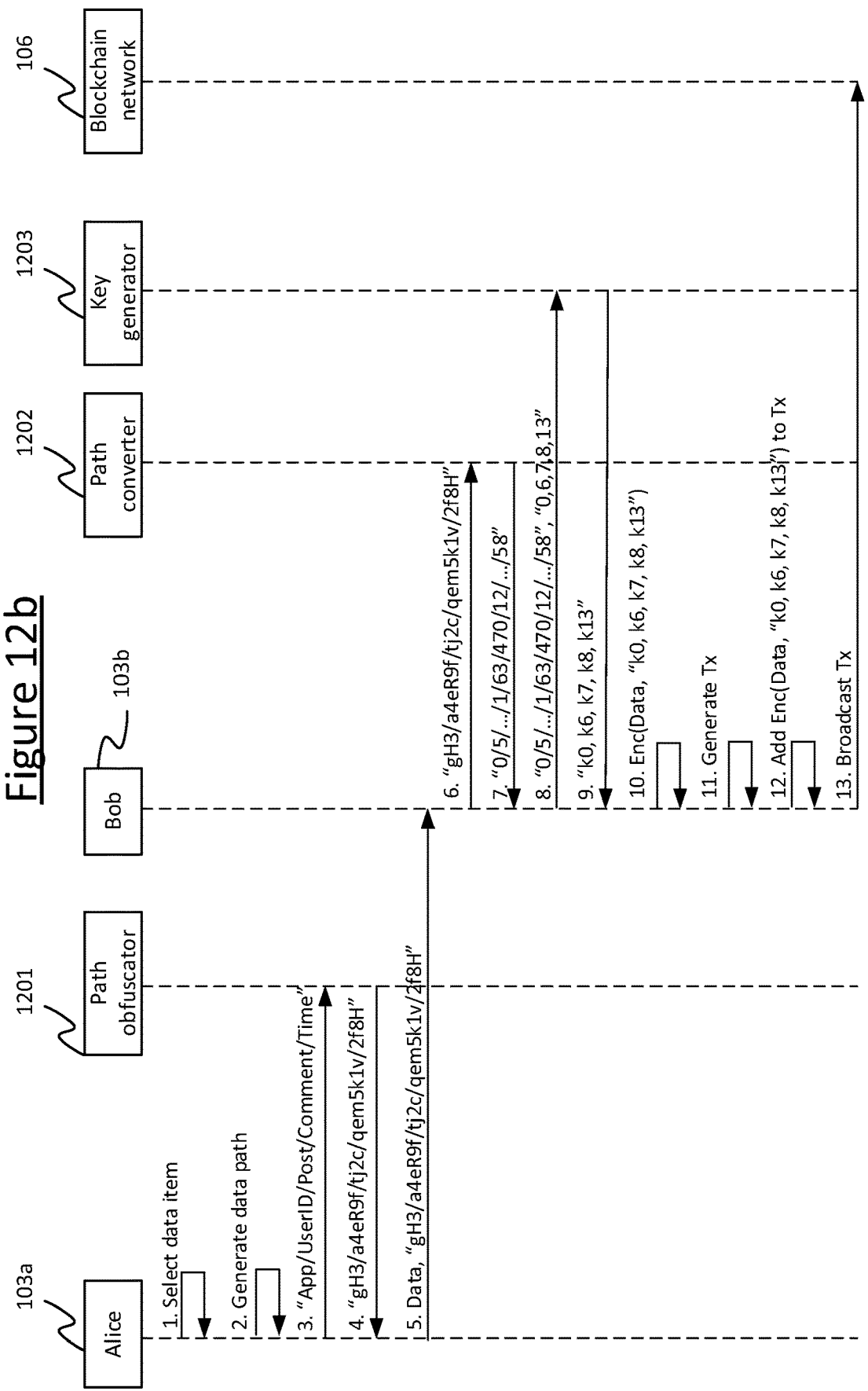

The process undertaken by Alice and Bob uses the path-obfuscation, path-conversion, and key-generation described above, and is visualised in FIGS. 12a and 12b. These figures depict the general workflow and the workflow populated with example data respectively.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a key generator and comprises:

obtaining a child key derivation path, wherein the child key derivation path comprises a sequence of elements, wherein the sequence of elements comprises one or more sets of one or more elements, each set of elements being generated based on a respective data item of a data path, and wherein each element in the sequence corresponds to a respective position of key in a respective level of the key structure; and generating one or more child keys based on the child key derivation path, wherein each respective child key is generated based on a respective element in the sequence at the respective position and of the respective level corresponding to that respective element.

[Each set of elements is generated based on a respective data item of the data path meaning that each set of elements is a function of the respective data item.]

Statement 2. The method of statement 1, comprising storing and/or outputting one or more of the generated child keys.

Statement 3. The method of statement 2, wherein the child key derivation path comprises a plurality of sub-paths, one for each set of elements, wherein each sub-path comprises a same initial element and a different respective final element; and wherein said storing and/or outputting of the one or more generated child keys comprises storing and/or outputting one child key per sub-path, wherein the child key is generated based on the respective final element.

Statement 4. The method of any preceding statement, wherein obtaining the child key derivation path comprises receiving the child key derivation path.

Statement 5. The method of any of statements 1 to 3, comprising:

obtaining the data path, and wherein obtaining the child key derivation path comprises generating the child key derivation path based on the obtained data path.

Statement 6. The method of statement 5, wherein generating the child key derivation path comprises:

generating the respective set of elements for each respective data item of the data path, wherein each respective set of elements together represent the data item, and each element of each set of elements is an integer.

Statement 7. The method of statement 6, wherein each integer is represented as a decimal representation or as a hexadecimal representation.

Statement 8. The method of statement 6 or statement 7, wherein each integer is a fixed-length integer.

Statement 9. The method of statement 8, wherein each parent key can have a maximum of $2^n$ child keys, and wherein n is the fixed-length integer.

Statement 10. The method of any of statements 5 to 9, wherein obtaining the data path comprises receiving the data path.

Statement 11. The method of statement 10, wherein the received data path is an obfuscated version of a non-obfuscated data path, each data item of the obfuscated data path being an obfuscated version of a respective non-obfuscated data item of the non-obfuscated data path.

Statement 12. The method of any of statements 5 to 9, wherein obtaining the data path comprises generating the data path.

Statement 13. The method of statement 10 or statement 12, comprising generating an obfuscated version of the data path, and wherein the child key derivation path is generated based on the obfuscated data path.

In embodiments, the method may comprise obtain the data path and generating the obfuscated version of the data path. The method may comprise generating a respective set of elements for each respective obfuscated data item of the obfuscated data path, wherein each respective set of elements together represent the obfuscated data item.

Statement 14. The method of statement 11 or statement 13, wherein each data item of the data path is obfuscated separately.

Statement 15. The method of any one of statements 11, 13 or 14, wherein each data item of the data path is obfuscated using any one or more of:

randomisation,
encryption using an encryption key,
XOR encryption using an XOR key,
substitution using a mapping function, and/or
a hash function.

Statement 16. The method of any preceding statement, wherein the data path corresponds to a folder structure, and wherein each data item belongs to a different folder of the folder structure.

Statement 17. The method of statement 2 or any statement dependent thereon, wherein said outputting comprises at least one of:

outputting the one or more generated child keys to an encryption function configured to encrypt data based on at least one of the one or more generated child keys;

outputting the one or more generated child keys to a signature function configured to generate a digital signature based on at least one of the one or more generated child keys;

sending the one or more generated child keys to a different party;

generating a respective blockchain address for each of the one or more generated child keys, and outputting the respective blockchain addresses to the different party; and generating a blockchain transaction comprising an output locked to at least one of the one or more generated child keys.

Statement 18. A computer-implemented method of generating a data path for use by a key generator for generating keys of a hierarchical key structure, wherein the key structure comprising a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a path generator and comprises:

obtaining a data path comprising one or more data items;
generating a respective set of one or more elements for each respective data item of the data path, wherein each respective set of elements together represent the data item, and each element of each set of elements is an integer;
generating a child key derivation path based on the respective sets of one or more elements; and
outputting the child key derivation path.

Statement 19. The method of statement 18, wherein said outputting of the child key derivation path comprises outputting the child key derivation path to the key generator, the key generator being configured to generate one or more child keys based on the child key derivation path.

Statement 20. The method of statement 18 or statement 19, wherein each integer is represented as a decimal representation or as a hexadecimal representation.

Statement 21. The method of statements 18 to 20, wherein each integer is a fixed-length integer.

Statement 22. The method of statement 21, wherein each parent key can have a maximum of $2^n$ child keys, and wherein n is the fixed-length integer.

Statement 23. The method of any of statements 18 to 22, wherein obtaining the data comprises receiving the data path.

Statement 24. The method of statement any of statements 18 to 22, wherein obtaining the data comprises generating the data path.

Statement 25. The method of any of statements 18 to 24, wherein the obtained data path is an obfuscated version of a non-obfuscated data path.

Statement 26. Computer equipment comprising:
memory comprising one or more memory units; and
processing apparatus comprising one or more processing units, wherein the memory stores code arranged to run on the processing apparatus, the code being configured so as when on the processing apparatus to perform the method of any preceding statement.

Statement 27. A computer program embodied on computer-readable storage and configured so as, when run on one or more processors, to perform the method of any preceding statement.

According to another aspect disclosed herein, there may be provided a method comprising the actions of the key generator and the path generator.

According to another aspect disclosed herein, there may be provided a system comprising the computer equipment of the key generator and the path generator.

The invention claimed is:

1. A computer-implemented method of generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a key generator and comprises:

obtaining a data path comprising a plurality of data items, wherein obtaining the data path comprises receiving the data path;
obtaining a child key derivation path, wherein the child key derivation path comprises a sequence of elements, wherein the sequence of elements comprises one or more sets of one or more elements, each set of elements being generated based on a respective data item of the data path, wherein each element in the sequence corresponds to a respective position of key in a respective level of the key structure;
wherein obtaining the child key derivation path comprises generating the child key derivation path based on the obtained data path, and wherein either:
the received data path is an obfuscated version of a non-obfuscated data path, each data item of the obfuscated data path being an obfuscated version of a respective non-obfuscated data item of the non-obfuscated data path; or
the method comprises generating an obfuscated version of the data path, and wherein said generating of the child key derivation path based on the obtained data path comprises generating the child key derivation path based on the obfuscated data path, and wherein said generating of the respective set of elements for each respective data item of the data path comprises generating the respective set of elements for each respective data item of the obfuscated data path; and
generating one or more child keys based on the child key derivation path, wherein each respective child key is generated based on a respective element in the sequence at the respective position and of the respective level corresponding to that respective element.

2. The method of claim 1, comprising storing and/or outputting one or more of the generated child keys.

3. The method of claim 2, wherein the child key derivation path comprises a plurality of sub-paths, one for each set of elements, wherein each sub-path comprises a same initial element and a different respective final element; and
wherein said storing and/or outputting of the one or more generated child keys comprises storing and/or outputting one child key per sub-path, wherein the child key is generated based on the respective final element.

4. The method of claim 2, wherein said outputting comprises at least one of:
outputting the one or more generated child keys to an encryption function configured to encrypt data based on at least one of the one or more generated child keys;
outputting the one or more generated child keys to a signature function configured to generate a digital signature based on at least one of the one or more generated child keys;
sending the one or more generated child keys to a different party;
generating a respective blockchain address for each of the one or more generated child keys, and outputting the respective blockchain addresses to the different party; and
generating a blockchain transaction comprising an output locked to at least one of the one or more generated child keys.

5. The method of claim 1, wherein obtaining the child key derivation path comprises receiving the child key derivation path.

6. The method of claim 1, wherein generating the child key derivation path comprises:
generating the respective set of elements for each respective data item of the data path, wherein each respective set of elements together represent the data item, and each element of each set of elements is an integer.

7. The method of claim 6, wherein each integer is represented as a decimal representation or as a hexadecimal representation.

8. The method of claim 6, wherein each integer is a fixed-length integer.

9. The method of claim 8, wherein each parent key can have a maximum of $2^n$ child keys, and wherein n is the fixed-length integer.

10. The method of claim 1, wherein obtaining the data path comprises generating the data path.

11. The method of claim 1, wherein each data item of the data path is obfuscated separately.

12. The method of claim 1, wherein each data item of the data path is obfuscated using any one or more of:
randomisation,
encryption using an encryption key, XOR encryption using an XOR key,
substitution using a mapping function, and/or
a hash function.

13. The method of claim 1, wherein the data path corresponds to a folder structure, and wherein each data item belongs to a different folder of the folder structure.

14. A computer-implemented method of generating a data path for use by a key generator for generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a path generator and comprises:
obtaining a data path comprising a plurality of data items, wherein obtaining the data path comprises receiving the data path, and wherein the received data path is an obfuscated version of a non-obfuscated data path, each data item of the obfuscated data path being an obfuscated version of a respective non-obfuscated data item of the non-obfuscated data path;
generating a respective set of one or more elements for each respective data item of the data path, wherein each respective set of elements together represent the data item, and each element of each set of elements is an integer;
generating a child key derivation path based on the respective sets of one or more elements; and
outputting the child key derivation path.

15. Computer equipment comprising:
memory comprising one or more memory units; and
processing apparatus comprising one or more processing units, wherein the memory stores code arranged to run on the processing apparatus, the code being configured so as when run on the processing apparatus, the processing apparatus performs a method of generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a key generator and comprises:
obtaining a data path comprising a plurality of data items, wherein obtaining the data path comprises receiving the data path;
obtaining a child key derivation path, wherein the child key derivation path comprises a sequence of elements, wherein the sequence of elements comprises one or more sets of one or more elements, each set of elements being generated based on a respective data item of the data path, wherein each element in the sequence corresponds to a respective position of key in a respective level of the key structure;
wherein obtaining the child key derivation path comprises generating the child key derivation path based on the obtained data path, and wherein either:
i) the received data path is an obfuscated version of a non-obfuscated data path, each data item of the obfuscated data path being an obfuscated version of a respective non-obfuscated data item of the non-obfuscated data path; or
ii) the method comprises generating an obfuscated version of the data path, and wherein said generating of the child key derivation path based on the obtained data path comprises generating the child key derivation path based on the obfuscated data path, and wherein said generating of the respective set of elements for each respective data item of the data path comprises generating the respective set of elements for each respective data item of the obfuscated data path; and
generating one or more child keys based on the child key derivation path, wherein each respective child key is generated based on a respective element in the sequence at the respective position and of the respective level corresponding to that respective element.

16. A computer program embodied on non-transitory computer-readable storage media and configured so as, when run on one or more processors, the one or more processors perform a method of generating keys of a hierarchical key structure, wherein the key structure comprises a hierarchy of levels, the hierarchy of levels comprising a master level and one or more child levels, wherein the master level comprises a master key, and wherein each child level comprises one or more child keys, each respective child key of a given level being linked to one key of a preceding level, wherein that one key of the preceding level is a respective parent key of the respective child key, and wherein the method is performed by a key generator and comprises:
obtaining a data path comprising a plurality of data items, wherein obtaining the data path comprises receiving the data path;
obtaining a child key derivation path, wherein the child key derivation path comprises a sequence of elements, wherein the sequence of elements comprises one or more sets of one or more elements, each set of elements being generated based on a respective data item of the data path, and wherein each element in the sequence corresponds to a respective position of key in a respective level of the key structure;
wherein obtaining the child key derivation path comprises generating the child key derivation path based on the obtained data path, and wherein either:

i) the received data path is an obfuscated version of a non-obfuscated data path, each data item of the obfuscated data path being an obfuscated version of a respective non-obfuscated data item of the non-obfuscated data path; or ii) the method comprises generating an obfuscated version of the data path, and wherein said generating of the child key derivation path based on the obtained data path comprises generating the child key derivation path based on the obfuscated data path, and wherein said generating of the respective set of elements for each respective data item of the data path comprises generating the respective set of elements for each respective data item of the obfuscated data path; and generating one or more child keys based on the child key derivation path, wherein each respective child key is generated based on a respective element in the sequence at the respective position and of the respective level corresponding to that respective element.

* * * * *